(12) United States Patent
Ihara

(10) Patent No.: US 8,456,486 B2
(45) Date of Patent: Jun. 4, 2013

(54) IMAGE PROCESSING APPARATUS AND IMAGE PROCESSING PROGRAM

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 696 days.

(21) Appl. No.: 12/684,862

(22) Filed: Jan. 8, 2010

(65) Prior Publication Data

US 2011/0007092 A1    Jan. 13, 2011

(30) Foreign Application Priority Data

May 11, 2009    (JP) ................................. 2009-114205

(51) Int. Cl.
  *G09G 5/00* (2006.01)
  *G06F 17/00* (2006.01)
  *G06K 19/06* (2006.01)
  *G06K 9/00* (2006.01)
  *H04N 1/40* (2006.01)

(52) U.S. Cl.
  USPC ........... 345/605; 345/600; 345/629; 235/375; 235/494; 382/181; 358/3.28

(58) Field of Classification Search
  USPC .. 345/629, 600, 605; 235/375, 435; 358/3.28; 382/181
  See application file for complete search history.

(56) References Cited

U.S. PATENT DOCUMENTS

| | | | | |
|---|---|---|---|---|
| 5,226,116 A | * | 7/1993 | Sasaki | 345/467 |
| 5,862,270 A | | 1/1999 | Lopresti et al. | |
| 6,116,510 A | | 9/2000 | Nishino | |
| 6,219,460 B1 | * | 4/2001 | Tatsuta | 382/270 |
| 6,222,950 B1 | * | 4/2001 | Sugiura et al. | 358/1.9 |
| 6,364,209 B1 | * | 4/2002 | Tatsuta et al. | 235/494 |
| 6,548,768 B1 | | 4/2003 | Pettersson et al. | |
| 6,614,914 B1 | * | 9/2003 | Rhoads et al. | 382/100 |
| 6,663,008 B1 | | 12/2003 | Pettersson et al. | |
| 6,674,427 B1 | | 1/2004 | Pettersson et al. | |
| RE39,985 E | * | 1/2008 | Tatsuta | 382/270 |
| 7,967,216 B2 | * | 6/2011 | Kato et al. | 235/492 |
| 8,189,923 B2 | * | 5/2012 | Yoshida | 382/190 |

(Continued)

FOREIGN PATENT DOCUMENTS

| | | |
|---|---|---|
| JP | 9-179924 A | 7/1997 |
| JP | 2833975 A | 10/1998 |

(Continued)

OTHER PUBLICATIONS

Communication from the Japanese Patent Office dated Jan. 22, 2013, in a counterpart application No. 2009-114205.

*Primary Examiner* — M Good Johnson
(74) *Attorney, Agent, or Firm* — Sughrue Mion, PLLC

(57) ABSTRACT

An image processing apparatus includes an information converting unit and an output unit. The information converting unit converts information into an information expression image formed by a dot arrangement pattern in which information is expressed by arranging a given number or less of dots in a unit display area which is an information unit. The output unit arranges the converted information expression image. The output unit superimposes the converted information expression image on image information. The output unit outputs the superimposed information expression image. In the dot arrangement pattern, the arrangement of the dots is determined so that the number of the dots denoting 1 or 0 of a bit sequence of a given error correction code word is a subset equal to or smaller than the given number, and the dot arrangement pattern is readable by a machine.

14 Claims, 8 Drawing Sheets

| SUBSETS OF RS (4, 2) OF $2^3$ ELEMENTS | 4-BIT INFORMATION |
|---|---|
| 000000000000 | 0000 |
| 000001010110 | 0001 |
| 000010100111 | 0010 |
| 000011110001 | 0011 |
| 000100011101 | 0100 |
| 000101001011 | 0101 |
| 001000010111 | 0110 |
| 001001000001 | 0111 |
| 001010110000 | 1000 |
| 001100001010 | 1001 |
| 010000100101 | 1010 |
| 010010000010 | 1011 |
| 010011010100 | 1100 |
| 010100111000 | 1101 |
| 011000110010 | 1110 |
| 011001100100 | 1111 |

U.S. PATENT DOCUMENTS

| | | |
|---|---|---|
| 2004/0095337 A1 | 5/2004 | Pettersson et al. |
| 2004/0113893 A1 | 6/2004 | Pettersson et al. |
| 2004/0113898 A1 | 6/2004 | Pettersson et al. |
| 2006/0076416 A1 | 4/2006 | Petterson |
| 2006/0109308 A1* | 5/2006 | Miyamoto .................. 347/43 |
| 2006/0154559 A1* | 7/2006 | Yoshida ................... 446/297 |
| 2007/0158420 A1 | 7/2007 | Sonoda et al. |
| 2008/0192300 A1* | 8/2008 | Kenji ....................... 358/3.29 |
| 2009/0060341 A1* | 3/2009 | Yoshida ................... 382/190 |
| 2009/0091530 A1* | 4/2009 | Yoshida ................... 345/156 |
| 2009/0122351 A1* | 5/2009 | Tsuchitoi .................. 358/3.28 |

FOREIGN PATENT DOCUMENTS

| | | |
|---|---|---|
| JP | 10-320497 A | 12/1998 |
| JP | 2003-511762 T | 3/2003 |
| JP | 2005-070980 A | 3/2005 |
| JP | 2007-179111 A | 7/2007 |
| JP | 2008-109578 A | 5/2008 |

* cited by examiner

FIG. 2

| SUBSETS OF BCH (9, 5, 3) | 4-BIT INFORMATION |
|---|---|
| 000000000 | 0000 |
| 000011001 | 0001 |
| 000101011 | 0010 |
| 000110010 | 0011 |
| 001010110 | 0100 |
| 001100100 | 0101 |
| 010000111 | 0110 |
| 010101100 | 0111 |
| 011001000 | 1000 |
| 011010001 | 1001 |
| 100001110 | 1010 |
| 100100101 | 1011 |
| 101000001 | 1100 |
| 101011000 | 1101 |
| 110001001 | 1110 |
| 110010000 | 1111 |

FIG. 3

| SUBSETS OF RS (4, 2) OF $2^3$ ELEMENTS | 4-BIT INFORMATION |
|---|---|
| 000000000000 | 0000 |
| 000001010110 | 0001 |
| 000010100111 | 0010 |
| 000011110001 | 0011 |
| 000100011101 | 0100 |
| 000101001011 | 0101 |
| 001000010111 | 0110 |
| 001001000001 | 0111 |
| 001010110000 | 1000 |
| 001100001010 | 1001 |
| 010000100101 | 1010 |
| 010010000010 | 1011 |
| 010011010100 | 1100 |
| 010100111000 | 1101 |
| 011000110010 | 1110 |
| 011001100100 | 1111 |

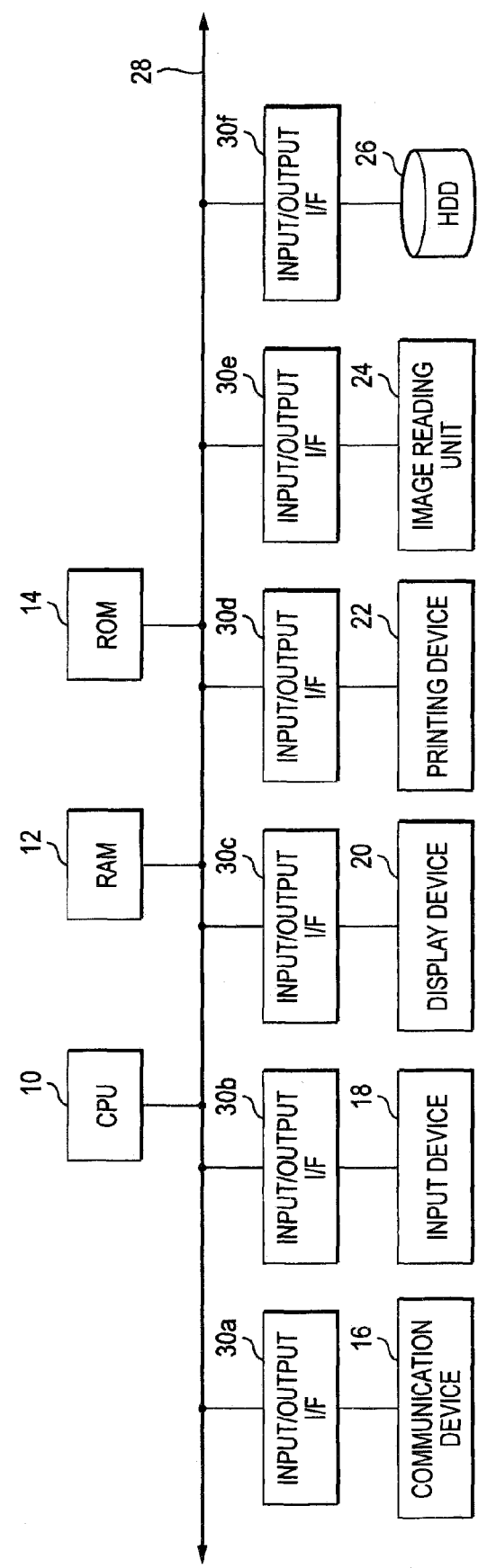

IMAGE PROCESSING APPARATUS AND IMAGE PROCESSING PROGRAM

CROSS-REFERENCE TO RELATED APPLICATIONS

This application is based upon and claims priority under 35 USC 119 from Japanese Patent Application No. 2009-114205, filed May 11, 2009.

BACKGROUND

Technical Field

The present invention relates to an image processing apparatus and an image processing program.

SUMMARY OF THE INVENTION

According to an aspect of the invention, an image processing apparatus includes an information converting unit and an output unit. The information converting unit converts information into an information expression image formed by a dot arrangement pattern in which information is expressed by arranging a given number or less of dots in a unit display area which is an information unit. The output unit arranges the converted information expression image. The output unit superimposes the converted information expression image on image information. The output unit outputs the superimposed information expression image. In the dot arrangement pattern, the arrangement of the dots is determined so that the number of the dots denoting 1 or 0 of a bit sequence of a given error correction code word is a subset equal to or smaller than the given number, and the dot arrangement pattern is readable by a machine.

BRIEF DESCRIPTION OF THE DRAWINGS

Exemplary embodiments of the invention will be described in detail based on the following figures, wherein:

FIG. 2 is a diagram illustrating an example of a table representing a relationship between an error correction code, which is expressed by the dot arrangement pattern, and expressed information;

FIG. 3 is a diagram illustrating another example of the table representing the relationship between the error correction code, which is expressed by the dot arrangement pattern, and the expressed information;

FIG. 5 is a diagram illustrating an example of the hardware configuration of a computer serving as an image processing apparatus according to the exemplary embodiment;

DETAILED DESCRIPTION

Hereinafter, a mode for carrying out the invention (hereinafter, referred to as an exemplary embodiment) will be described.

Figures 1A, 1B:
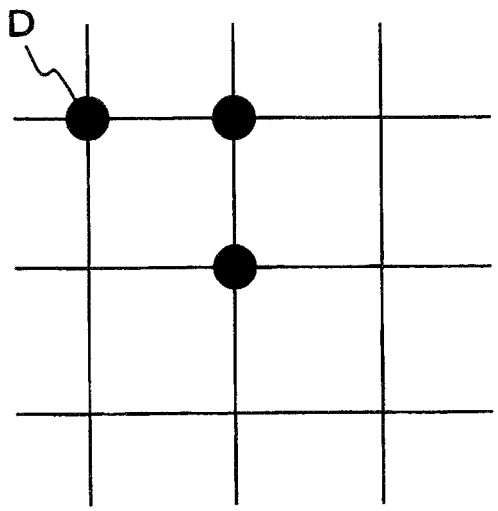
FIGS. 1A and 1B are diagrams illustrating an example of an information expression image according to an exemplary embodiment.

FIGS. 1A and 1B show an example of an information expression image according to an exemplary embodiment. FIG. 1A shows an example of the information expression image and FIG. 1B shows a bit sequence corresponding to the information expression image. In FIG. 1A, dots D denote 1 of the bit sequence of FIG. 1B, but may denote 0.

In FIG. 1A, the information expression image is formed by a dot arrangement pattern which expresses information by arranging a given number or less of dots D in a unit display area. The arrangement of the dots is determined so that the dot arrangement pattern is subset where the number of dots denoting 1 or 0 of a bit sequence of a predetermined error correction code word is equal to or smaller than the above given number.

In the example of FIG. 1A, the unit display area is constituted by lattice points of 3 by 3 and set as information unit expressing a certain amount of information. The number of the lattice points constituting the unit display area is not limited to 3 by 3, but may appropriately be determined. Alternatively, the lattice points may not be displayed. In the example of FIG. 1A, the dots D constituting the information image are shown with a black color, but the color of the dots is not limited thereto. Moreover, the shape of the dots is not limited to a circular shape. For example, the dots may have a rectangular shape.

As described above, the number of the dots D is equal to or smaller than the given number. In the example of FIG. 1A, the number of the lattice points is set to 3 by 3 and the number of the dots D is equal to or smaller than 4. However, the invention is not limited thereto. The appropriate number of the dots can be determined so that the image quality is inhibited from deteriorating in a relationship with the number of the lattice points. As shown in FIG. 1B, the dots D denote 1 of the bit sequence of the error correction code word, but may denote 0. In either case, the subset of the error correction code word is selected so that the number of the dots D is equal to or less than the given number.

FIG. 2 shows an example of a table representing a relationship between an error correction code, which is expressed by the dot arrangement pattern, and expressed information. In this exemplary embodiment, the number n of the lattice points in the unit display area and the number t permitting error detection of the dots D correspond to error correction codes which can be subjected to error correction of t bits among n bits. For example, the number of the lattice points is 3 by 3. When the dot arrangement pattern of which the original bit sequence can be detected is set even in a case where one dot is missed or a dot-like image is formed by attachment of waste particles to the lattice point having no dot, n is equal to 9 and t is equal to 1. The BCH (9, 5, 3) code, which is one of error correction codes capable of correcting 1-bit error among nine bits, can be used. The BCH (9, 5, 3) code is an error correction code which is capable of adding parity 4-bit information to 5-bit information and correcting up to a 1-bit error and can express information of 2 to the power of 5=32.

Next, only code words of which the number of is equal to or smaller than a given number are extracted from all of the error correction code words (hereinafter, referred to as a code word). When the given number is 4, seventeen code words are extracted from thirty two code words. As the given number is smaller, the image quality can be inhibited from deteriorating.

However, since an amount of information which can give expression may be reduced, it is satisfactory that the given number is about 4.

By selecting the code words of the power-of-two as large as possible among the extracted cord words, the subsets of the code words are generated. As an example of a selection method, a method of selecting the code words from the code words with a smaller number when the code words are expressed by binary numbers can be used. In the above example, since the power-of-two which is the largest among the numbers equal to or smaller than 17 is 16, sixteen code words are selected and the subsets of the code words are generated. Since 4-bit information can be expressed using sixteen code words belonging to the subsets, as shown in FIG. 2, a table is generated by allowing 9-bit code words to correspond to the 4-bit information. In this way, a piece of 4-bit information is expressed in each one unit display area of the dot arrangement pattern.

The information expression image shown in FIGS. 1A and 1B uses the table shown in FIG. 2 and expresses the 4-bit information by using the 9-bit code word. In the example shown in FIGS. 1A and 1B, the information expression image is read in order of first, second, and third rows, is formed by the code word of 110010000, and expresses 1111, which is the 4-bit information, from the table shown in FIG. 2.

In this way, the subsets are generated using sixteen code words from the BCH (9, 5, 3), which is one of the error correction codes, and the 4-bit information is expressed. Therefore, even when one dot is missed or one dot-like image is formed, the original information can be restored owing to the error correction function.

In the example shown in FIG. 2, the subsets of the BCH (9, 5, 3) are generated by extracting the code words of which the number of 1s equal to or smaller than the given number from the code words. However, the subsets may be generated by extracting the code words of which the number of 0s is equal to or smaller than a given number from the code words. In this case, the dots D of the information expression image shown in FIG. 1A become 0 of the code word.

Figures 4A, 4B:
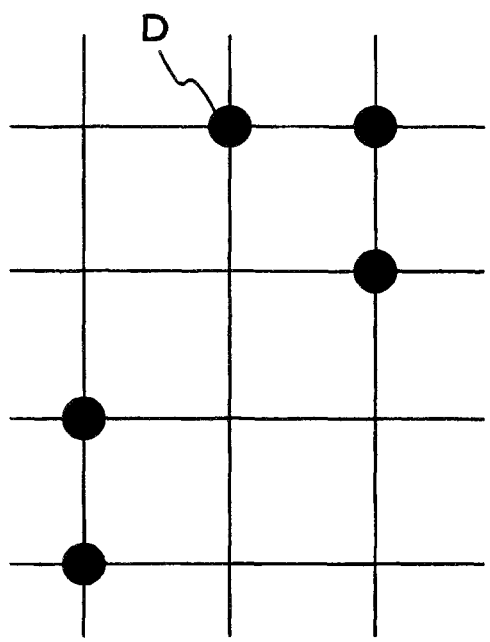
FIGS. 4A and 4B are diagrams illustrating another example of the information expression image according to the exemplary embodiment.

FIG. 3 shows another example of the table representing the relationship between the error correction code, which expressed by the dot arrangement pattern, and the expressed information. In FIGS. 4A and 4B, another example of the information expression image according to the exemplary embodiment is shown. In FIG. 3, the Reed-Solomon code (RS (4, 2) code of $2^3$ elements) is used as the error correction code. In FIGS. 4A and 4B, the information expression image using the table in FIG. 3 is shown and lattice points of 4 by 3 are used as the unit display area.

In general, when the Reed-Solomon code is used as the RS (N, K) of $2^k$ elements, the number of bits forming one block is k bits (where k is a small letter). The code length is N blocks, information has K blocks (where k is a capital letter), and a parity is N−K blocks. An error can be corrected up to (N−K)/2 blocks. Accordingly, the RS (4, 2) code of $2^3$ elements is formed by four 3-bit blocks. Among the blocks, two blocks are information blocks and the remaining two blocks are the parity. Therefore, an error of one or less block can be decoded using the parity. Accordingly, the decoding is possible even when an error of one bit occurs in a 12-bit code word. Even when an error of three bits occurs, the code word is an error correction code which can be decoded as long as the error occurs within one block.

In the Reed-Solomon code, since the number of information bits is six bits, information of 2 to the power of 6=64 can be expressed. When the number of 1s equal to or smaller than a given number is extracted, for example, five code or less words are extracted from all code words belonging to the Reed-Solomon code, the number corresponds to twenty four. Since the maximum value of the power-of-two which does not exceed twenty four is sixteen, sixteen code words are selected from the extracted twenty four code words to generate the subset. Since 4-bit information can be expressed by the sixteen code words belonging to the subset, as shown in FIG. 3, the table is generated by allowing 12-bit code words to correspond to the 4-bit information. In this way, a piece of 4-bit information is expressed in each one unit display area where the dot arrangement pattern is formed.

In the information expression image shown in FIGS. 4A and 4B, the 12-bit code words (the subsets of the Reed-Solomon code shown in the table of FIG. 3) are arranged at the lattice points of 4 by 3 and the 4-bit information is expressed. In the example shown in FIGS. 4A and 4B, four 3-bit blocks are read in order of first, second, third, and fourth rows, are formed by the code word of 011001100100, 1111, which is the 4-bit information, express the table shown in FIG. 3.

In the above-described exemplary embodiment, the BCH code and the Reed-Solomon code have been used, but other error correction codes may be used. The 4-bit information is expressed as an example of the expressed information, but information with the large number of bits can also be expressed by a method of adjusting the number of dots of the dot arrangement pattern.

Hereinafter, an exemplary embodiment will be described in which information is embedded in a document image or the like by using the information expression image and the embedded information is decoded.

FIG. 5 shows an example of the hardware configuration of a computer serving as the image processing apparatus according to the exemplary embodiment. In FIG. 5, the image processing apparatus includes a central processor (for example, a CPU such as a micro processor can be used) 10, a random access memory (RAM) 12, a read-only memory (ROM) 14, a communication device 16, an input device 18, a display device 20, a printing device 22, an image reading device 24, and a hard disk drive (HDD) 26, all of which are connected to each other via a bus 28. The communication device 16, the input device 18, the display device 20, the printing device 22, the image reading device 24, and the hard disk drive (HDD) 26 are connected to the bus 28 via input/output interfaces 30a, 30b, 30c, 30d, 30e, and 30f, respectively.

The CPU 10 controls the operation of each unit, which is described below, on the basis of a control program stored in the RAM 12 or the ROM 14. The RAM 12 mainly functions as a work area of the CPU 10. The ROM 14 stores control programs such as a BIOS and data used by the CPU 10.

The communication device 16 is constituted by a USB (Universal Serial Bus) port, a network port, or other appropriate interfaces and is used for the CPU 10 to exchange data with an external apparatus through communication unit such as a network.

The input device 18, which is constituted by a keyboard, a pointing device, a touch panel, or the like, is used for a user to input an operation instruction or the like.

The display device 20, which is constituted by a liquid crystal display, a touch panel, or the like, displays a result or the like processed by the CPU 10.

The printing device 22 forms a document image or the like, in which information is embedded using an information expression image, on a medium such as a paper sheet. The printing device 22 includes a printer engine. A laser printer engine forming an image by an electrophotographic process, for example is used as the printer engine. Alternatively, an ink jet printer engine may also be used as the printer engine.

The image reading device 24, which is organized by a scanner, for example, reads the document image or the like in which information is embedded using an information expression image.

The hard disk drive 26, which is a storage device, stores a variety of data necessary for a process, which is described below, such as the table expressing the relationship between the dot arrangement pattern and the expressed information. Instead of the hard disk device 22, a non-volatile storage device such as an EEPROM may be used.

Figure 6:
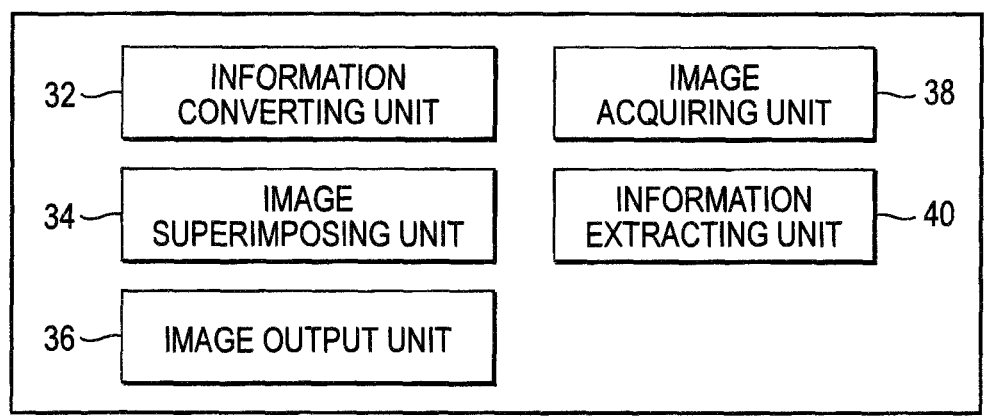
FIG. 6 is a block diagram illustrating the functions of the image processing apparatus according to the exemplary embodiment.

FIG. 6 is a block diagram illustrating the function of the image processing apparatus according to the exemplary embodiment. In FIG. 6, the image processing apparatus includes an information converting unit 32, an image superimposing unit 34, an image output unit 36, an image acquiring unit 38, and an information extracting unit 40. The functions are realized by, for example, the CPU 10 and a program which controls the processing operation of the CPU 10.

The information converting unit 32 converts additive information such as an identification information (ID) of a document or information on an access authority to a document into the information expression image shown in FIGS. 1A and 1B or FIGS. 4A and 4B with reference to the table shown in FIG. 2 or 3. In this case, the information converting unit 32 sequentially selects the additive information of k bits (for example, four bits), acquires the code word corresponding to the k bits with reference to the table, and converts the code word into the dot arrangement pattern. In order to improve a reading capability upon additional detection, the additive information may be coded into an error correction code in advance. The table shown in FIG. 2 or 3 is generated in advance and stored in advance in the hard disk drive 22 or the like. Alternatively, the information converting unit 32 may generate the table in the order described in FIG. 2 or 3 on the basis of the designated error correction code and the number of the bits of the additive information and store the generated table in the hard disk drive 22 or the like.

The image superimposing unit 34 arranges the dot arrangement patterns generated by converting each additive information by the information converting unit 32 and superimposes the dot arrangement patterns with image information, which is an output target such as a document image. In this case, the dot arrangement patterns are arranged in areas where document images or the like are continuously formed. Examples of the dot arrangement pattern includes a so-called raster scan order of arranging a dot arrangement pattern from the upper left to the upper right, descending one pattern, and then again arranging the dot arrangement pattern from the upper left to the upper right and a so-called block raster order of arranging a dot arrangement pattern in an area (an area larger than the dot arrangement pattern) with a predetermined size and then arranging the remaining dot arrangement pattern in an area adjacent to the area.

The image output unit 36 outputs the image information with which the image superimposing unit 34 superimposes the dot arrangement patterns to the printing device 22 or the like. In this way, the document image or the like formed such that the information expression image constituted by the dot arrangement pattern is readable by a machine is generated. The image output unit 36 may have a configuration in which the dot arrangement pattern is printed on a medium on which the image information such as the document image or the like is printed in advance. In this case, the image superimposing unit 34 may be omitted. The image output unit 36 permits the printing device 22 to print the dot arrangement pattern on the medium on which the image information is printed in the raster scan order or the block raster order. In the printing of the dot arrangement pattern, toner or ink which is invisible to the eyes may be used. In this case, the dot arrangement pattern may be disposed on the position at which contents such as the document image are printed. The printing device 22 prints the document image or the like. Alternatively, the document image or the like may be displayed by the display device 20, instead of the printing.

The image acquiring unit 38 permits the image reading device 24 to acquire the image information such as the document image. Alternatively, the image acquiring unit 38 may permit the communication device 16 to acquire the image information through the communication unit such as a network.

The information extracting unit 40 detects the dots forming the information expression image from the image information acquired by the image acquiring unit 38. In this case, the dots forming the information expression image are detected by binarizing the acquired image information, subjecting the binarized image information to a labeling process or the like, calculating the size of the detected area, and excluding an area larger than an appropriately determined certain threshold value and an area smaller than another threshold value. The dots forming the information expression image can be restored by removing the dots other than the dots of the embedded information expression image by the use of a dot interval of a certain value.

Next, the information extracting unit 40 detects the dots on the upper left from the detected dots. A skew angle of the image information acquired by the image acquiring unit 38 is calculated by obtaining the coordinates of the dots of the same row from the detected dots and performing the Hough transform or the like. On the basis of the skew angle, the image information is subjected to skew correction with reference to the upper left dot position. The dot arrangement pattern is read from the upper left dot From the image information subjected to the skew correction and the additive information is restored sequentially by k bits (for example, four bits) with reference to the table shown in FIG. 2 or 3.

Figure 7:
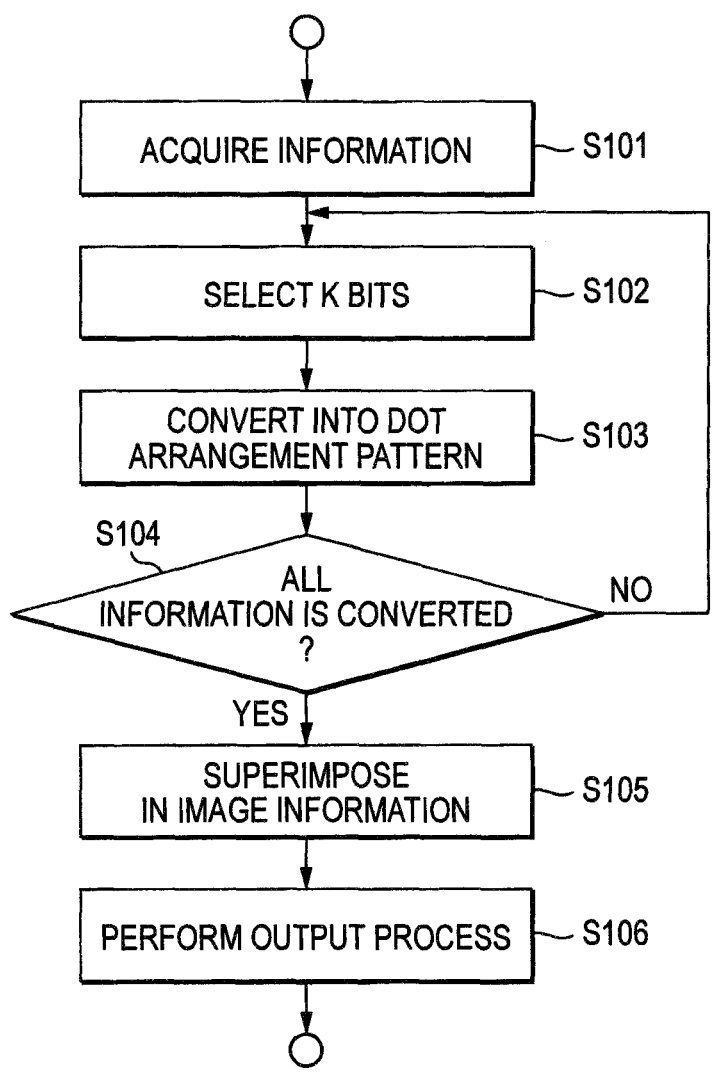
FIG. 7 is a flowchart illustrating an exemplary operation of the image processing apparatus according to the exemplary embodiment.

FIG. 7 is a flowchart illustrating the exemplary operation of the image processing apparatus according to the exemplary embodiment. In FIG. 7, the exemplary operation of superimposing the additive information to the image information and outputting the image information is performed.

In FIG. 7, the information converting unit 32 first acquires the additive information such as the identification information (ID) of a document input by the input device 18 and the additive information on an access authority to a document (S101). The communication device 16 may acquire the additive information through the communication unit such as a network.

Next, the information converting unit 32 selects k bits (for example, four bits) from the additive information (S102), obtains the corresponding code word with reference to the table shown in FIG. 2 or 3, and converts the bit row of the code word into the dot arrangement pattern (S103).

The information converting unit 32 determines whether all of the additive information acquired in step S101 in accordance with the above process are converted (S104). When it is determined that all of the additive information is not converted, the processes from step S102 are performed repeatedly.

Alternatively, when it is determined in step S104 that all of the additive information are converted, the image superimposing unit 34 arranges the dot arrangement patterns in the order of the code words and superimposes the additive information with image information which is the output target such as a document image (S105). The image information in which the dot arrangement patterns are superimposed is subjected to an output process such as printing by the image output unit 36 (S106). Alternatively, as described above, the dot arrangement patterns may be printed on the medium on which the image information such as a document image is printed in advance.

In accordance with the process, the image information in which the additive information is embedded as the information expression image by the dot arrangement patterns is printed.

Figure 8:
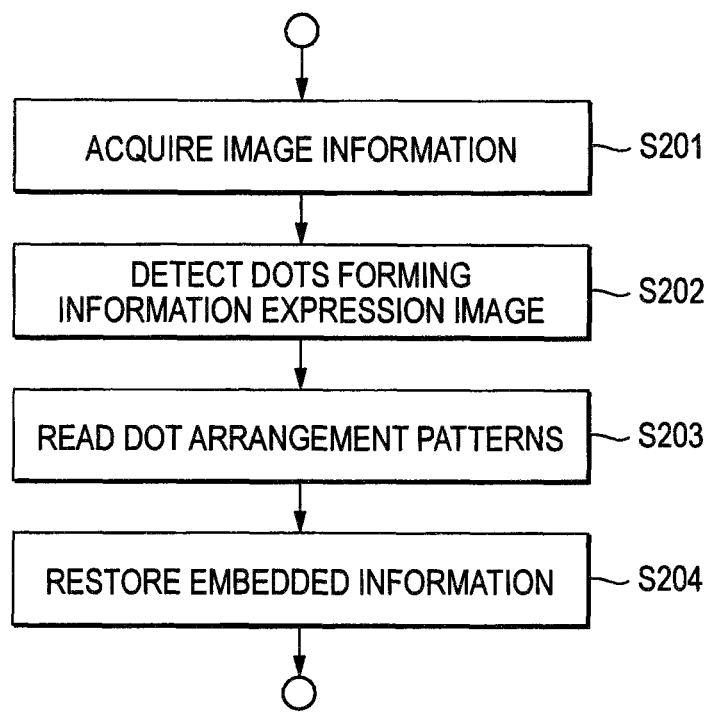
FIG. 8 is a flowchart illustrating another exemplary operation of the image processing apparatus according to the exemplary embodiment.

FIG. 8 is a flowchart illustrating another exemplary operation of the image processing apparatus according to the exemplary embodiment. FIG. 8 shows the exemplary operation of extracting the additive information from the image information in which the additive information is superimposed.

In FIG. 8, when the image acquiring unit 38 permit the image reading device 24 to acquire the image information such as a document image (S201), the information extracting unit 40 detects the dots forming the information expression image by the above-described labeling process or the like (S202).

Next, the information extracting unit 40 performs the skew correction or the like on the image information and reads the dot arrangement patterns from the dots detected in step S202 (S203). The information extracting unit 40 restores the additive information from the read dot arrangement patterns with reference to the table shown in FIG. 2 or 3 (S204).

The above-described program executing the steps in FIGS. 7 and 8 may be stored in the record medium. Alternatively, the program may be supplied through the communication unit. In this case, the above-described program can be understood as the invention of "a computer readable record medium recording the program".

"The computer readable record medium recording the program" refers to a record medium which can be read by a computer and stores the program and which is used to install and execute the program and to distribute the program.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The exemplary embodiments were chosen and described in order to best explain the principles of the invention and its practical application, thereby enabling other skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
    an information converting unit that converts binary information of y bits into an information expression image, the information expression image being a dot arrangement pattern among a plurality of dot arrangement patterns, the dot arrangement pattern expressed as a pattern of dots at lattice points in a unit of display area, the pattern of dots corresponding to an x-bit code word among a plurality of x-bit code words that is associated with one of an index value equal to the binary information among $2^y$ index values; and
    an output unit that arranges the converted information expression image, superimposes the converted information expression image on image information, and outputs the superimposed information expression image,
    wherein the plurality of dot arrangement patterns are $2^y$ dot arrangement patterns associated with the $2^y$ index values and corresponding to a subset of the plurality of x-bit code words having z bits or fewer of 1 or 0 value expressed as dots in the pattern of dots, and the dot arrangement pattern is readable by a machine, and
    wherein x, y, and z are positive integers and z is a maximum number of dots superimposed on the image information per the unit of display area without deterioration of the image information.

2. The image processing apparatus according to claim 1, wherein the image processing apparatus generates information associating the information expression image with information expressed by the dot arrangement pattern forming the information expression image based on the code word and the y bits of the binary information.

3. The image processing apparatus according to claim 1, wherein the code word complies with Bose-Chaudhuri-Hocquenghem code.

4. The image processing apparatus according to claim 1, wherein z is equal to four.

5. An image processing apparatus comprising:
    an image acquiring unit that acquires an information expression image superimposed on image information, the information expression image being a dot arrangement pattern among a plurality of dot arrangement patterns, the dot arrangement pattern expressed as a pattern of dots at lattice points in a unit of display area, the pattern of dots corresponding to an x-bit code word among a plurality of x-bit cods words that is associated with one of an index value equal to the binary information among $2^y$ index values; and
    an information extracting unit that detects the dot arrangement pattern from the acquired information expression image and extracts binary information of y bits equal to the index value associated with the pattern of dots of the dot arrangement pattern,
    wherein the plurality of dot arrangement patterns are $2^y$ dot arrangement patterns associated with the $2^y$ index values and corresponding to a subset of the plurality of x-bit code words having z bits or fewer of 1 or 0 value expressed as dots in the pattern of dots, and the dot arrangement pattern is readable by a machine, and
    wherein x, y, and z are positive integers and z is a maximum number of dots superimposed on the image information per the unit of display area without deterioration of the image information.

6. The image processing apparatus according to claim 5, wherein the image processing apparatus generates information associating the information expression image with information expressed by the dot arrangement pattern forming the information expression image based on the code word and the y bits of the binary information.

7. The image processing apparatus according to claim 5 wherein the code word complies with Bose-Chaudhuri-Hocquenghem code.

8. The image processing apparatus according to claim 5, wherein z is equal to four.

9. A computer readable medium storing a program causing a computer to execute a process for generating an information expression image, the process comprising:
    converting binary information of y bits into the information expression image, the information expression image being a dot arrangement pattern among a plurality of dot arrangement patterns, the dot arrangement pattern expressed as a pattern of dots at lattice points in a unit of display area, the pattern of dots corresponding to an x-bit code word among a plurality of x-bit code words that is associated with one of an index value equal to the binary information among $2^y$ index values;

arranging the converted information expression image;

superimposing the converted information expression image on image information; and outputting the superimposed information expression image, wherein the plurality of dot arrangement patterns are $2^y$ dot arrangement patterns associated with the $2^y$ index values and corresponding to a subset of the plurality of x-bit code words having z bits or fewer of 1 or 0 value expressed as dots in the pattern of dots, and the dot arrangement pattern is readable by a machine, and wherein x, y, and z are positive integers and z is a maximum number of dots superimposed on the image information per the unit of display area without deterioration of the image information.

10. The computer readable medium according to claim 9, wherein the code word complies with Bose-Chaudhuri-Hocquenghem code.

11. The computer readable medium according to claim 9, wherein z is equal to four.

12. A computer readable medium storing a program causing a computer to execute a process for extracting information from an information expression image, the process comprising:

acquiring the information expression image superimposed on image information, the information expression image being a dot arrangement pattern among a plurality of dot arrangement patterns, the dot arrangement pattern expressed as a pattern of dots at lattice points in a unit of display area, the pattern of dots corresponding to an x-bit code word among a plurality of x-bit code words that is associated with one of an index value equal to the binary information among $2^y$ index values;

detecting the dot arrangement pattern from the acquired information expression image; and extracting binary information of y bits equal to the index value associated with the pattern of dots of the dot arrangement pattern, wherein the plurality of dot arrangement patterns are $2^y$ dot arrangement patterns associated with the $2^y$ index values and corresponding to a subset of the plurality of x-bit code words having z bits or fewer of 1 or 0 value expressed as dots in the pattern of dots, and the dot arrangement pattern is readable by a machine, and wherein x, y, and z are positive integers and z is a maximum number of dots superimposed on the image information per the unit of display area without deterioration of the image information.

13. The computer readable medium according to claim 12 wherein the code word complies with Bose-Chaudhuri-Hocquenghem code.

14. The computer readable medium according to claim 12, wherein z is equal to four.

* * * * *